(12) United States Patent
Yu et al.

(10) Patent No.: US 10,239,407 B2
(45) Date of Patent: Mar. 26, 2019

(54) VARIABLE CARRIER SWITCHING FREQUENCY CONTROL OF VARIABLE VOLTAGE CONVERTER

(71) Applicant: Ford Global Technologies, LLC, Dearborn, MI (US)

(72) Inventors: Lan Yu, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/005,671

(22) Filed: Jan. 25, 2016

(65) Prior Publication Data

US 2017/0210233 A1 Jul. 27, 2017

(51) Int. Cl.
| | |
|---|---|
| *B60L 1/00* | (2006.01) |
| *B60L 11/18* | (2006.01) |
| *B60L 11/08* | (2006.01) |
| *H02M 3/155* | (2006.01) |
| *B60L 11/12* | (2006.01) |
| *B60L 11/14* | (2006.01) |
| *B60L 15/00* | (2006.01) |

(52) U.S. Cl.
CPC ........... *B60L 11/1803* (2013.01); *B60L 11/08* (2013.01); *B60L 11/12* (2013.01); *B60L 11/14* (2013.01); *B60L 11/1816* (2013.01); *B60L 15/007* (2013.01); *H02M 3/155* (2013.01); *B60L 2210/10* (2013.01); *B60L 2240/527* (2013.01); *B60L 2240/529* (2013.01); *B60L 2240/547* (2013.01); *B60L 2240/549* (2013.01); *B60L 2270/142* (2013.01)

(58) Field of Classification Search
None
See application file for complete search history.

(56) References Cited

U.S. PATENT DOCUMENTS

| | | | |
|---|---|---|---|
| 7,459,864 B2 | 12/2008 | Lys | |
| 8,754,622 B2 | 6/2014 | Dobkin et al. | |
| 8,884,660 B2 | 11/2014 | Fukuta et al. | |
| 9,088,224 B2 * | 7/2015 | Chen | H02M 3/155 |
| 9,577,534 B2 * | 2/2017 | Ishizeki | H02M 1/32 |
| 2014/0292076 A1 | 10/2014 | Nakamura et al. | |
| 2015/0214854 A1 | 7/2015 | Gu et al. | |
| 2017/0033704 A1 * | 2/2017 | Lei | B60R 16/03 |
| 2017/0036563 A1 * | 2/2017 | Degner | B60L 15/04 |
| 2017/0106756 A1 * | 4/2017 | Xu | B60L 11/18 |
| 2017/0166064 A1 * | 6/2017 | Chen | B60L 11/18 |
| 2017/0210233 A1 * | 7/2017 | Yu | B60L 11/1803 |
| 2017/0222641 A1 * | 8/2017 | Zou | H03K 17/161 327/109 |
| 2017/0240064 A1 * | 8/2017 | Lee | B60L 11/1851 |
| 2017/0245401 A1 * | 8/2017 | Yonak | H05K 7/20927 |
| 2017/0246962 A1 * | 8/2017 | Weber | B60L 11/1846 |
| 2017/0257022 A1 * | 9/2017 | Bryant | H02M 1/34 |

* cited by examiner

*Primary Examiner* — Lincoln Donovan
*Assistant Examiner* — Khareem E Almo
(74) *Attorney, Agent, or Firm* — David B. Kelley; Brooks Kushman P.C.

(57) ABSTRACT

A controller is configured to select a rate of change direction of an output voltage of a variable voltage converter (VVC) based on a direction of current flow associated with a capacitor of the VVC, and to adjust a magnitude of the rate of change direction based on directions of current flow associated with the capacitor and an electric machine coupled to the VVC.

17 Claims, 5 Drawing Sheets

VARIABLE CARRIER SWITCHING FREQUENCY CONTROL OF VARIABLE VOLTAGE CONVERTER

TECHNICAL FIELD

This application is generally related to controlling a variable voltage converter.

BACKGROUND

Electrified vehicles include hybrid electric vehicles (HEV) and battery electric vehicles (BEV). Electrified vehicles include a traction battery to store energy to be used for propulsion and other purposes. The traction battery is configured to operate within a particular voltage range. However, propulsion and other loads of the vehicle may have improved performance when operated outside the particular voltage range; typically, this is at higher voltages than the traction battery. Many electrified vehicles include a variable voltage converter to convert the voltage of the traction battery to a voltage level desired by the electric machines.

SUMMARY

An electric vehicle power conversion system includes a variable voltage converter (VVC) configured to generate an output voltage for a load, and a controller configured to select a rate of change direction for the output voltage based on a current flow direction through a capacitor of the VVC, and to adjust a magnitude of the rate of change direction based on the current flow direction and a load current flow direction.

A vehicle includes an electric machine, a variable voltage converter (VVC) configured to produce a voltage for the electric machine, and a controller configured to select a positive rate of change direction for the voltage in response to a current flow direction being into a capacitor of the VVC, and to decrease a magnitude of the rate of change direction in response to the current flow direction and an electric machine current flow direction being same.

A controller-implemented method, for operating an electric powertrain DC-DC converter coupled with an electric machine, includes selecting a rate of change direction of an output voltage of the converter based on a current flow direction of a capacitor of the converter, and adjusting a magnitude of the rate of change direction based on the current flow direction of the capacitor and a current flow direction of the electric machine.

DETAILED DESCRIPTION

Figure 1:
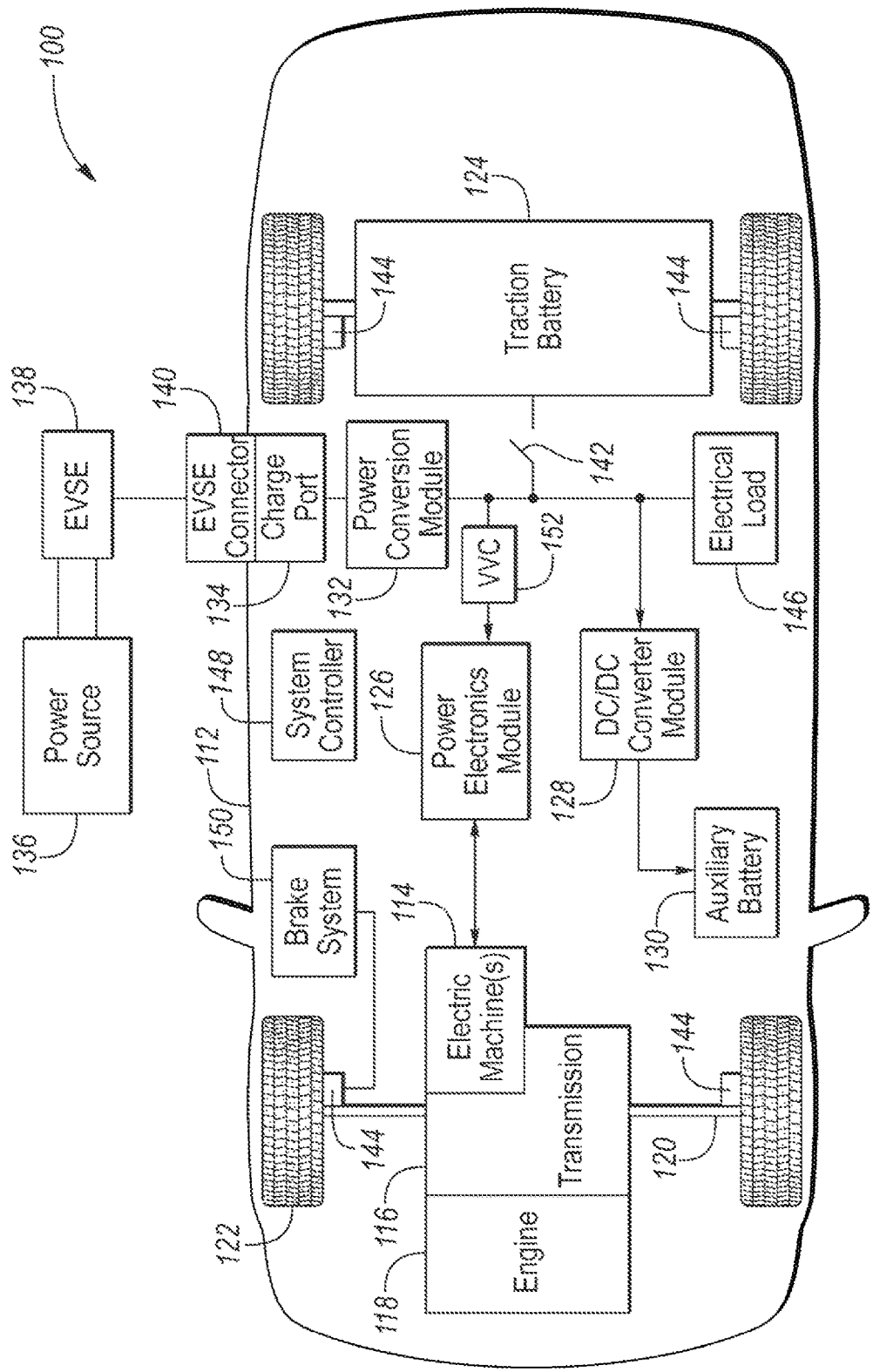
FIG. 1 is a diagram of a hybrid vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A Variable Voltage Controller (VVC) is a key module in many electric machine drive systems for Hybrid Electric Vehicles (HEVs) and Electric Vehicles (EVs). The VVC provides a DC to DC conversion in which the output voltage is variable based on the control of the VVC. Often the VVC is used to boost the input voltage to an operating voltage. The input voltage is the battery voltage and the operating voltage is a voltage at which interfaces an inverter drives an electric machine, i.e., motor and generator. One advantage of a VVC is that the VVC decouples and regulates the drive inverter dc-voltage input from the battery terminal voltage variations. Also, a VVC allows a design of the electric machine to be performed separately from the design of the battery system.

A goal for controlling a VVC may include an optimized VVC boost strategy that minimizes energy transfer loss due to un-necessary energy shuffling between an inverter/electric-machine and a battery. Ideally, it is desirable to minimize the energy transfer loss without compromising other system requirements such as stability, bandwidth and robustness. Traditionally VVC boost strategies are designed to generate power needed to support a speed and torque command of the inverter and electric-machine. A VVC controller provides an output including a DC bus voltage command that is used to set a point of VVC voltage regulation. However, frequent changes of the DC bus voltage over time may lead to unnecessary energy shuffling between the battery and the inverter/electric-machine. Either direction of energy transfer results in a tangible amount of power loss due to resistance in the energy path. Previous VVC control systems didn't consider the loss induced by such energy transfer between battery and electric-machines.

Here, an optimized VVC boost strategy is presented to minimize energy transfer loss due to un-necessary energy shuffling between the battery and the inverter/electric-machine without compromising other requirements such as stability, bandwidth and robustness. The optimized VVC boost strategy including an optimized VVC boost voltage that is determined by adjusting a rate of change of the DC bus voltage. The rate of change of the DC bus voltage is a function of a load current and a capacitor current. The load current includes the current flowing to the electric machine through the inverter. The capacitor current is a current to a smoothing capacitor also referred to as an output capacitor. The optimization strategy may be categorized into four cases based on a flow direction of load current and capacitor current. For each case, a specific optimization strategy may be developed. A key concept of the strategies include either increasing or decreasing the rate of change along with selecting a direction of the rate of change such as a rate of increase or a rate of decrease of DC bus voltage. The development of each strategy may be independent of the other strategies, or the development may be unified in that each strategy follows a common strategy. That is, the strategies may utilize totally different approaches, or may share an algorithm, function, or structure. Also, the four strategies may be implemented simultaneously or only some of the strategies may be implemented for a corresponding specific case.

For example, there are many ways to adjust a rate of change of Vdc, including a filter, a voltage schedule look up table, an adaptive filter, a slew rate adjustment control system, and a feedforward or feedback control strategy. The proposed strategy provides the boost to meet torque and speed demand of electric-machines, while reducing unnecessary energy shuffling between the inverter/electric-machine and the battery. By smoothing out a ripple of inductor current, the loss induced by energy shuffling is decreased.

FIG. 1 depicts an electrified vehicle 112 that is typically referred to as a plug-in hybrid-electric vehicle (PHEV). A typical plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may include a battery electric vehicle (BEV). In a BEV configuration, the engine 118 may not be present.

A traction battery or battery pack 124 stores energy that can be used by the electric machines 114. A vehicle battery pack 124 typically provides a high voltage DC output. The traction battery 124 is electrically coupled to one or more power electronics modules. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase AC current to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. A vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery. Other high-voltage loads 146, such as compressors and electric heaters, may be coupled to the high-voltage output of the traction battery 124.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

One or more electrical loads 146 may be coupled to the high-voltage bus. The electrical loads 146 may have an associated controller that operates and controls the electrical loads 146 when appropriate. Examples of electrical loads 146 may be a fan, a heating element and/or an air-conditioning compressor.

Electronic modules in the vehicle 112 may communicate via one or more vehicle networks. The vehicle network may include a plurality of channels for communication. One channel of the vehicle network may be a serial bus such as a Controller Area Network (CAN), Local Interconnect Network (LIN), or other industry standard bus. One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or via discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

The output voltage of the VVC 152 may be controlled to achieve a desired reference voltage. Existing control strategies generally rely on linear conventional digital control based on an averaging model and small signal analysis. Global stability under large disturbances may not be preserved. The configurations described herein improve the dynamic response of the voltage regulation under large load variations.

Figure 2:
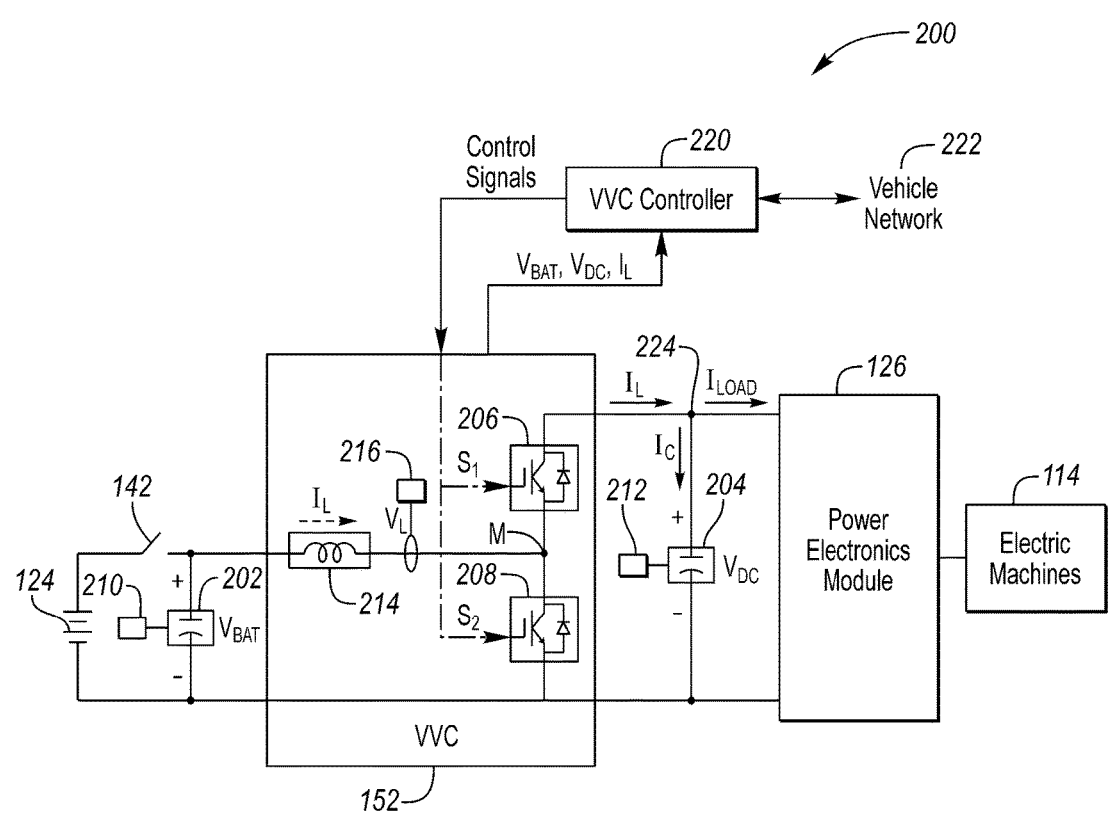
FIG. 2 is a diagram of a variable voltage converter.

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. Through operation of the VVC 152, a voltage at the output terminals may be greater than a voltage at the input terminals. The vehicle may include a VVC controller 220 that monitors electrical parameters (e.g., voltage and current) at various locations within the VVC 152. In some configurations, the VVC controller 220 may be included as part of the VVC 152. The VVC controller 220 may determine an output voltage reference, $V_{dc}^*$. The VVC controller 220 may determine, based on the electrical parameters and the voltage reference, $V_{dc}^*$, a control signal sufficient to cause the VVC 152 to achieve the desired output voltage. In some configurations, the control signal may be implemented as a pulse-width modulated (PWM) signal in which a duty cycle of the PWM signal is varied. The VVC controller 220 may command the VVC 152 to provide the desired output voltage using the control signal. The particular control signal at which the VVC 152 is operated may be directly related to the amount of voltage boost provided by the VVC 152.

With reference to FIG. 2, the VVC 152 may boost or "step up" the voltage potential of the electrical power provided by the traction battery 124. The traction battery 124 may provide high voltage (HV) DC power. The context of high voltage is a voltage over 100 Volts DC. In some configurations, the traction battery 124 may provide a voltage between 150 and 400 Volts. A contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage.

An output capacitor 204 may be electrically coupled between the output terminals of the VVC 152. The output capacitor 204 may stabilize the bus voltage and reduce voltage and current ripple at the output of the VVC 152.

Further, with reference to FIG. 2, the VVC 152 may include a first switching device 206 and a second switching device 208 for boosting an input voltage to provide the boosted output voltage. Each switching device 206, 208 may be individually controlled by a gate drive circuit (not shown) of the VVC controller 220 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208 to protect the switching devices 206,208. These diodes may be referred to as flyback diodes, freewheeling diodes, or clamp diodes and are used to eliminate flyback, which is a sudden voltage spike across an inductive load when the switch suddenly disconnects a supply voltage.

The vehicle system may include sensors for measuring electrical parameters of the VVC 152. A first voltage sensor 210 may be configured to measure the input voltage, (e.g., voltage of the battery 24), and provide a corresponding input signal ($V_{bat}$) to the VVC controller 220. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 220. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 220. The VVC controller 220 may include circuitry to filter and digitize the signals from the first voltage sensor 210 and the second voltage sensor 212.

An input inductor 214 may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding input signal ($I_L$) to the VVC controller 220. The input current through the input inductor 214 may be a result of the voltage difference between the input and the output voltage of the VVC 152, the conducting time of the switching devices 206, 208, and the inductance L of the input inductor 214. The VVC controller 220 may include circuitry to scale, filter, and digitize the signal from the current sensor 216.

The VVC controller 220 may be programmed to control the output voltage of the VVC 152. The VVC controller 220 may receive input from the VVC 152 and other controllers via a vehicle network 222, and determine the control signals. The vehicle network 222 may be coupled with the VSC 148. The VVC controller 220 may monitor the input signals ($V_{bat}$, $V_{dc}$, $I_L$, $V_{dc}$*) to determine the control signals. For example, the VVC controller 220 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at a particular duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle.

When designing the VVC 152, the switching frequency and the inductance value of the inductor 214 may be selected to satisfy a maximum allowable ripple current. The ripple current may be a periodic variation in the current of a DC signal. The ripple current may have harmonics that are in an audible frequency range that may add to the noise signature of the vehicle. Further, the ripple current may cause difficulties with accurately controlling devices fed by the source. During switching transients, the switching devices 206, 208 turn off at the maximum inductor current (DC current plus ripple current) which may cause large voltage spike across the switching devices 206, 208. Because of size and cost constraints, the inductance value may be selected based on the conducted current. In general, as current increases, it is generally desired to select an inductor having less inductance.

The switching frequency may be designed to limit the battery ripple current and peak inductor current under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz). In typical applications, the switching frequency of the VVC 152 is selected as a fixed frequency. The fixed frequency is generally selected to satisfy noise and ripple current specifications. However, the choice of the fixed frequency may not provide best performance over all operating ranges of the VVC 152.

Higher switching frequencies may guarantee lower ripple current and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 220 may be programmed to vary the switching frequency of the switching devices 206, 208 based on the duty cycle and the input current. The variation in switching frequency may improve fuel economy and reduce NVH issues while maintaining ripple current targets under worst case operating conditions.

A lumped element model of a VVC basically consists of an Inductor, such as Inductor 214 having a current $I_L$ to node 224. At node 224, the current $I_L$ flows into capacitor 204 shown as $I_C$ and/or load PEM 126 shown as $I_{LOAD}$. Along with the components L 214 and C 204, is a resistance of the path in series with L called R. Parameters R, L and C represent the resistance, inductance and capacitance of the VVC model respectively. All variables refer to the battery side to simplify the analysis. $V_{battery}(t)$ represents the battery voltage with respect to time, $V_{dc}(t)$ represents the DC bus voltage command with respect to time, $I_L(t)$ represents the inductor current with respect to time, and $I_c'(t)$ represents the current through capacitor with respect to time described by the following equations:

$$I_c' = \frac{C}{D(t)} \cdot \frac{dV_{dc}(t)}{dt} \quad (1)$$

$$I_L(t) = I_c'(t) + I_{load}'(t) \quad (2)$$

Additionally, $I_{load}'(t)$ represents the current to the generator inverter and motor inverter, and D(t) represents the duty cycle of VVC. All the variables are functions of time because the driving command and road condition change over time. The optimization criterion is defined as the cumulative loss induced by energy shuffling between the battery and load/inverter/electric-drive system as shown below:

$$\text{Loss}_{energy\_shuffling} = \int R \cdot I_L^2(t) dt \quad (3)$$

Although the direction and amplitude of the inductor current is affected by the fluctuation of the load current that is difficult to predict or control, the ripple of the inductor current can be smoothed out by adjusting the voltage across the capacitor voltage as shown in Equation (1). The basic concept of this optimization problem is to minimize the ripple of the inductor current by scheduling the DC bus voltage.

The optimization problem may be analyzed by focusing on the current flow at electrical node 224 in FIG. 2. The inductor current can be adjusted by manipulating the current through capacitor, which varies with respect to the rate of change of the DC bus voltage.

Figure 3:
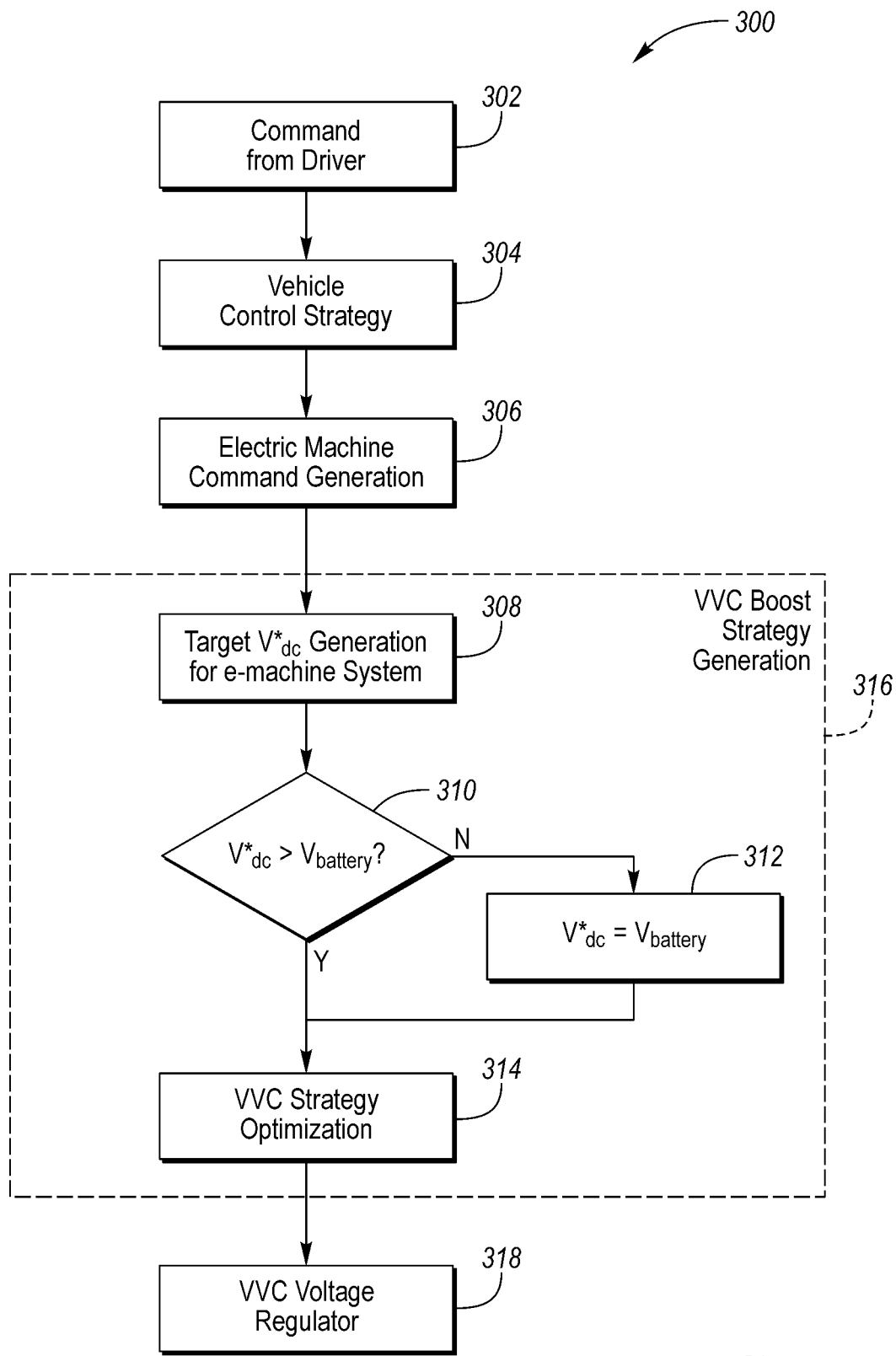
FIG. 3 is a flow diagram of a control strategy for a variable voltage converter.

FIG. 3 is an exemplary flow diagram 300 of a control strategy for a variable voltage converter (VVC) 152. The flow diagram may be performed by at least one controller in vehicle 112. For example, the flow diagram may be performed by the VVC controller 220, the VSC 148, a combination of both VVC 220 and VSC 148, or any other controller or combination of controllers processing data for the vehicle.

At operation 302, the controller 220 receives a command from a driver. The command may be a message in a vehicle network 222 including a vehicle bus such as a Car Area Network (CAN) bus, a Local Interconnect Network (LIN) bus, a FlexRay bus, an Ethernet bus, or other vehicle bus. The command may be a direct command from the driver such as a throttle position, or an indirect command from the driver such as a command from a cruise control module in operation.

At operation 304, the controller 220 receives a command from operation 302. The controller then applies a vehicle control strategy to the command from operation 302.

At operation 306, the controller 220 receives a command from operation 304. The controller then generates a command to control an inverter such as the PEM 126 and an electric machine such as the electric machine 114.

At operation 308, the controller 220 receives a command from operation 306. The controller then generates a signal indicative of a target DC bus voltage ($V_{dc}^*$) also referred to as a DC voltage setpoint. The target DC bus voltage is the voltage that the controller 220 may use as a setpoint to regulate the output voltage of the VVC to drive the PEM 126 and the electric machine 114.

At operation 310, the controller 220 compares the target DC bus voltage ($V_{dc}^*$) with the battery voltage. If the battery voltage ($V_{battery}$) is greater than $V_{dc}^*$, the controller sets $V_{dc}^*$ to $V_{battery}$ at operation 312.

At operation 314, the controller 220 receives $V_{dc}^*$ from operation 310 or 312 and performs a VVC optimization strategy. At operation 314, the controller 220 selects a direction of the rate of change of $V_{dc}^*$ and adjusts the rate of change of $V_{dc}^*$.

Operations 308 to operation 314 are part of a VVC boost strategy, and the output is used at operation 318, in which the controller 220 regulates the voltage of the VVC. The voltage may be regulated by modulating the switches 206 and 208 to generate the output voltage.

At operation 318, the controller 220 receives $V_{dc}^*$ from operation 314 and controls the VVC to output a voltage indicative of $V_{dc}^*$.

Figure 4:
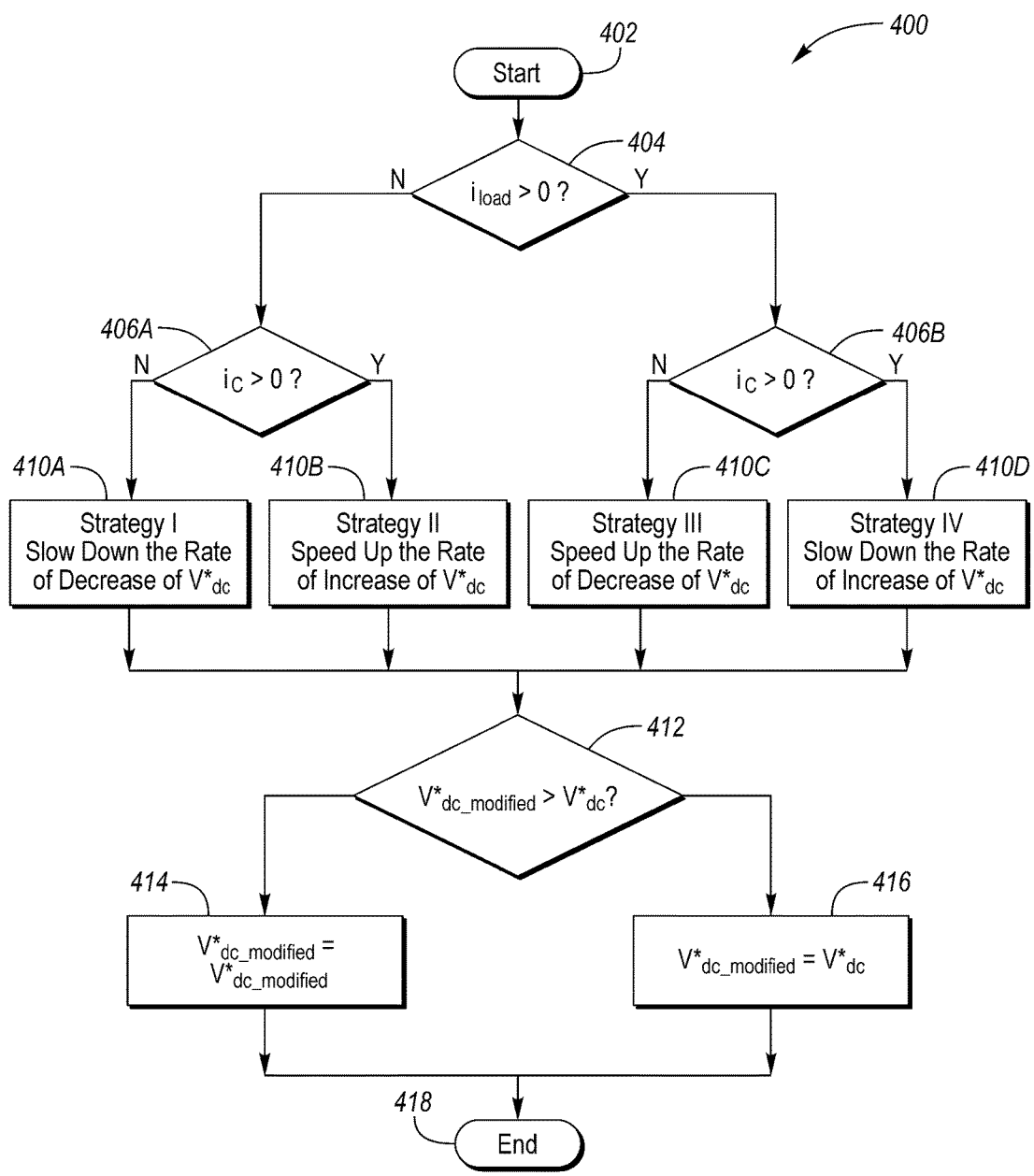
FIG. 4 is a flow diagram of an optimization control strategy for a variable voltage converter.

FIG. 4 is a flow diagram 400 of an optimization control strategy for a variable voltage converter (VVC) 152. The flow diagram 400 may be within the operation block 314 from FIG. 3. The flow diagram may be performed by a controller in vehicle 112. For example, the flow diagram may be performed by controller 220, but the process is not limited to a single controller.

The optimization strategy begins at operation 402. At operation 404, the controller 220 compares a direction of current flowing to the PEM 126 and electric machine 114. Here, a positive direction is if the current is flowing into the PEM 126 and electric machine 114. Likewise, a negative direction is if the current is flowing from the PEM 126 and electric machine 114.

At operation 406, the controller 220 compares a direction of current flowing to an output capacitor of the VVC, such as capacitor 204. Here, a positive direction is if the current is flowing into capacitor 204. Likewise, a negative direction is if the current is flowing from the capacitor 204.

At operation 410, the controller 220 selects a direction of a rate of change and adjusts the rate of change based on the direction of current flowing to the output capacitor and the direction of current flowing to the load. However, embodiments herein are not limited to the selection and adjustment based on the direction alone, the selection may be based on both the direction of current flowing and a magnitude of current flowing exceeding a threshold. In another embodiment, the selection may take into account hysteresis to improve stability. Other embodiments may adjust the rate of change based on a magnitude of the current flowing to the output capacitor and/or the load.

Here, operation 410 includes 4 distinct strategies, namely Strategy I 410A, Strategy II 410B, Strategy III 410C, and Strategy IV 410D. Strategy I 410A is a selection of a negative rate of change and an adjustment to decrease the negative rate of change based on current flowing from the capacitor and from the load. Strategy II 410B is a selection of a positive rate of change and an adjustment to increase the positive rate of change based on current flowing into the capacitor and from the load. Strategy III 410C is a selection of a negative rate of change and an adjustment to increase the negative rate of change based on current flowing from the capacitor and into the load. Strategy IV 410D is a selection of a positive rate of change and an adjustment to decrease the positive rate of change based on current flowing into the capacitor and into the load.

A goal of the four strategies listed above is to either speed up or slow down the rate of increase or decrease of DC bus voltage. The development of each strategy may be totally independent of the other strategies. Each strategy may utilize a totally different approach, or may share one or more algorithms in common. Also, each of the four strategies may be implemented simultaneously, or a subset of the strategies may be implemented limited to the corresponding specific case. For each strategy, there are many ways to adjust the rate of change of $V_{dc}$, for example, a filter, a voltage schedule look up table, an adaptive filter, a slew rate adjustment, and various feedforward and feedback control strategies.

There are many ways to achieve the goal proposed in FIG. 4 as described above. An example of a low pass filter is described in Equation (4), and an optimized schedule is described in Equations (5) and (6).

$$G(s) = \frac{V_{dc}^*}{V_{baseline}^*} = \frac{1}{\tau s + 1} \tag{4}$$

$$V_{dc}^*[k+1] = a \cdot V_{dc}^*[k] + (1-a) \cdot V_{baseline}^*[k] \tag{5}$$

$$a = \frac{\tau}{\tau + T_s} \tag{6}$$

At operation 412, the controller 220 compares a modified DC voltage setpoint ($V_{dc\_modified}^*$) with the target DC bus voltage ($V_{dc}^*$). If $V_{dc\_modified}^*$ is not greater than $V_{dc}^*$, the controller 220 branches to operation 414 in which $V_{dc\_modified}^*$ is set to the value of $V_{dc\_modified}^*$. If $V_{dc\_modified}^*$ is greater than $V_{dc}^*$, the controller 220 branches to operation 414 in which $V_{dc\_modified}^*$ is set to the value of $V_{dc}^*$. At operation 418, the controller 220 exits the VVC strategy optimization.

Figure 5:
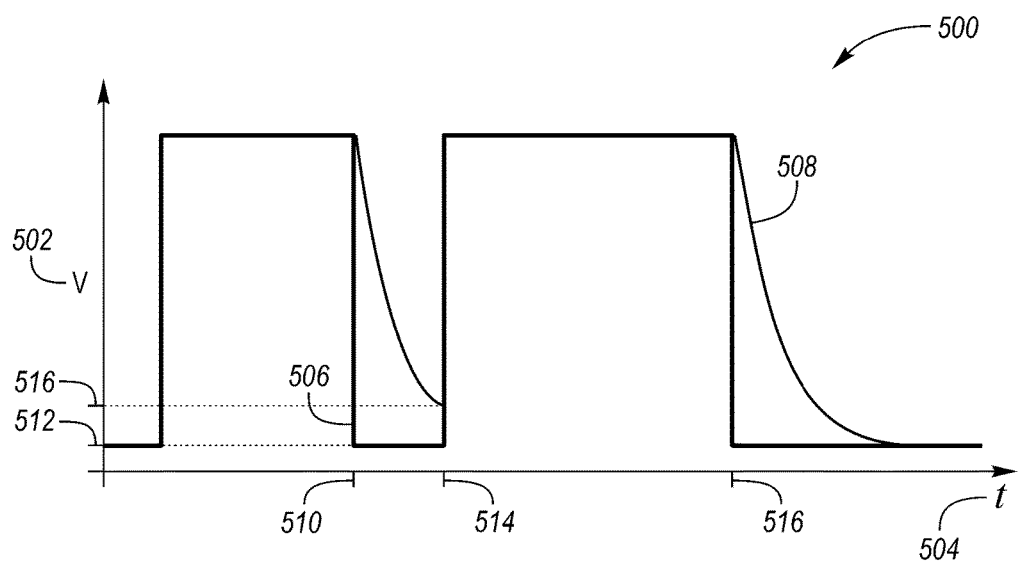
FIGS. 5 and 6 are graphical illustrations of outputs of variable voltage converters with respect to time based on optimization control strategies.

FIG. 5 is a graphical illustration 500 of an output voltage 502 of a variable voltage converter with respect to time 504 based on an optimization control strategy. The illustration includes a baseline waveform 506 being a DC bus command generated by a traditional VVC controller and an optimized waveform 508 being a DC bus voltage implemented according to strategy I of FIG. 4. The optimized waveform 508 is one possible solution of an optimized DC bus voltage. Here, the system is operating by modulating the VVC and at time 510 the VVC controller modulates switches of the VVC such that the output voltage of the VVC is at a low voltage level 512. The VVC controller maintains the low voltage level 512 until at time 514 when the VVC controller modulates switches of the VVC such that the output voltage of the VVC is at a high voltage level. The transitions in the baseline waveform 506 indicate a high rate of change in the negative direction at time 510 and a high rate of change in the positive direction at time 514.

An optimized alternative to the baseline waveform 506 is the optimized waveform 508. The optimized waveform 508 illustrates a slower rate of change in the negative direction than baseline waveform 506. Here, the optimized waveform 508 begins with a rate of change less than that of the baseline waveform 506, and the optimized waveform 508 continuously reduces the rate of change resulting in the profile from time 510 to time 514. At time 514, both the optimized waveform 508 and the baseline waveform 506 increase at approximately the same rate, as shown by the increase to the high voltage level. Then again at time 516, the optimized waveform 508 continuously reduces the rate of decrease resulting in the profile after time 516 is shown having a profile similar to an exponential decay profile.

Control of the VVC according to this optimization control strategy or modified boost strategy may be designed to meet a torque and speed demand of the inverter and electric-machine, while reducing unnecessary energy transfer between the battery and capacitor/load when the VVC is configured to operate in pass through mode. Often, the voltage is boosted again by the VVC and the energy transfer changes direction back to flowing from the battery to the capacitor/load. This is one strategy, however others may be used.

Figure 6:
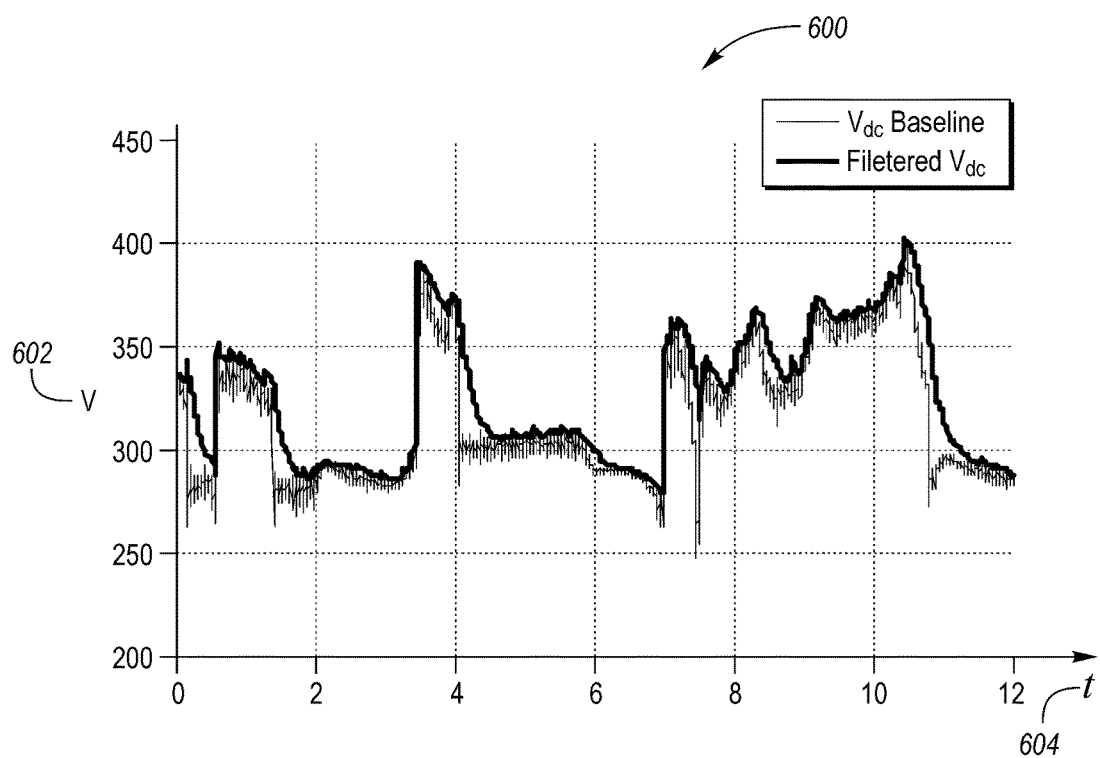

FIG. 6 is a graphical illustration 600 of an output voltage 602 of a variable voltage converter with respect to time 604 based on an optimization control strategy and a baseline control strategy. Here, the optimized VVC boost schedule compared to a previous VVC control strategy shown is actual data recorded over a 12-second interval during a test run on a closed course of a monitored hybrid vehicle capable of operating both control strategies. The sampling period is set to 1 ms, and the bandwidth of the filter is set to 5 Hz. The control strategy is presented in the following equation:

$$V_{dc}*[k+1] = \max\lfloor V_{baseline}, 0.995 \cdot V_{dc}*[k] + 0.005 \cdot V_{baseline}*[k] \rfloor \quad (7)$$

The use of the optimization strategy proposed in Equation (7) has reduced the ripple of the current significantly. Over this window of time, it was calculated that approximately 0.36 kJ of energy may be saved per unit resistance using this strategy. It should be noted that implementing a low pass filter is just one example to solve this problem. The purpose of this example is to clarify the concept shown in FIG. 4, and to illustrate the effectiveness of this concept.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric vehicle power conversion system comprising:
   a variable voltage converter, including a capacitor, configured to generate an output voltage for a load; and
   a controller configured to select a rate of change direction for the output voltage based on a current flow direction of the capacitor, and to adjust a magnitude of the rate of change direction based on the current flow direction and a load current flow direction.

2. The system of claim 1, wherein the rate of change direction is positive in response to the current flow direction being into the capacitor.

3. The system of claim 2, wherein adjusting the magnitude includes decreasing the magnitude in response to the current flow direction and load current flow direction being same.

4. The system of claim 2, wherein adjusting the magnitude includes increasing the magnitude in response to the current flow direction and load current flow direction being opposite.

5. The system of claim 1, wherein the rate of change direction is negative in response to the current flow direction being from the capacitor.

6. The system of claim 5, wherein adjusting the magnitude includes decreasing the magnitude in response to the current flow direction and load current direction being same.

7. The system of claim 5, wherein adjusting the magnitude includes decreasing the magnitude in response to the current flow direction and load current direction being opposite.

8. A vehicle comprising:
   an electric machine;
   a variable voltage converter, including a capacitor, configured to produce a voltage for the electric machine; and
   a controller configured to select a positive rate of change direction for the voltage in response to a current flow direction being into the capacitor, and to decrease a magnitude of the rate of change direction in response to the current flow direction and an electric machine current flow direction being same.

9. The vehicle of claim 8, wherein the controller is further configured to select a negative rate of change direction for the voltage in response to the current flow direction being from the capacitor.

10. The vehicle of claim 8, wherein the controller is further configured to increase the magnitude in response to the current flow direction and electric machine current flow direction being opposite.

11. The vehicle of claim 8, wherein the controller is further configured to decrease the magnitude using a filter or voltage schedule look-up table.

12. A controller-implemented method for operating an electric powertrain DC-DC converter coupled with an electric machine comprising:
- selecting a rate of change direction of an output voltage of the converter based on a current flow direction of a capacitor of the converter; and
- adjusting a magnitude of the rate of change direction based on the current flow direction of the capacitor and a current flow direction of the electric machine.

13. The method of claim 12, wherein the rate of change direction is positive in response to the current flow direction being into the capacitor.

14. The method of claim 12, wherein the rate of change direction is negative in response to the current flow direction being from the capacitor.

15. The method of claim 12, wherein the adjusting includes increasing the magnitude in response to the current flow directions being opposite.

16. The method of claim 12, wherein the adjusting includes decreasing the magnitude in response to the current flow directions being same.

17. The method of claim 12, wherein the adjusting is further based on a magnitude of current flow to the capacitor and a magnitude of current flow to the electric machine.

* * * * *